United States Patent [19]
Tsutsumi et al.

[11] Patent Number: 4,742,124
[45] Date of Patent: May 3, 1988

[54] RUBBER COMPOSITION FOR USE IN TIRE

[75] Inventors: Fumio Tsutsumi; Mitsuhiko Sakakibara; Yoshihisa Fujinaga, all of Yokkaichi; Noboru Oshima, Suzuka; Tatsuo Fujimaki, Higashimurayama, all of Japan

[73] Assignees: Japan Synthetic Rubber Co., Ltd.; Bridgestone Corporation, both of Tokyo, Japan

[21] Appl. No.: 70,117

[22] Filed: Jul. 6, 1987

Related U.S. Application Data

[63] Continuation of Ser. No. 739,646, May 31, 1985, abandoned.

[30] Foreign Application Priority Data

Jun. 1, 1984 [JP] Japan .................................. 59-110870

[51] Int. Cl.$^4$ ................................................. C08F 8/42
[52] U.S. Cl. .............................. 525/332.1; 525/332.2; 525/332.9; 525/359.1; 525/371
[58] Field of Search ............... 525/332.1, 332.2, 332.9, 525/359.1, 371

[56] References Cited

U.S. PATENT DOCUMENTS

| | | |
|---|---|---|
| 4,397,994 | 8/1983 | Takeuchi et al. ................. 525/332.3 |
| 4,482,678 | 11/1984 | Furukawa et al. ................. 525/332.9 |
| 4,515,922 | 5/1985 | Sakakibara et al. ................. 525/237 |
| 4,523,618 | 6/1985 | Yamamoto et al. ............. 525/332.9 |
| 4,526,934 | 7/1985 | Oshima et al. .................... 525/332.9 |
| 4,550,135 | 10/1985 | Iwama et al. ........................ 524/505 |

Primary Examiner—Joseph L. Schofer
Assistant Examiner—Bernard Lipman
Attorney, Agent, or Firm—Sughrue, Mion, Zinn, Macpeak & Seas

[57] ABSTRACT

A rubber composition for use in tire having improved rolling resistance, wet skid resistance and processability is disclosed, which comprises at least 20% by weight of a conjugated diolefin-vinyl-substituted aromatic hydrocarbon random copolymer. This random copolymer is produced by copolymerization with a particular initiator and coupling with a particular coupling agent, and has a content of vinyl-substituted aromatic hydrocarbon of 3–60% by weight, a content of tin bonded to copolymer of not less than 400 ppm and a Mooney viscosity $(ML_{1+4}^{100°C.})$ of 20–200.

7 Claims, No Drawings

RUBBER COMPOSITION FOR USE IN TIRE

This is a continuation of application Ser. No. 739,646 filed 5/31/85, now abandoned.

BACKGROUND OF THE INVENTION

1. Field of the Invention

This invention relates to a rubber composition suitable for use in a tire tread having a low rolling resistance, a high wet skid resistance and an excellent processability.

2. Description of the Prior Art

Lately, rubber materials having a low rolling resistance and a high skid resistance on wet road surface (wet skid resistance) have strongly been demanded as a rubber for tire tread in order to meet the requirements on low fuel consumption and running safety of automobile vehicles. Since these properties are conflictive to each other, however, rubbers simultaneously satisfying these properties are not proposed up to the present. For this reason, a blend of different rubbers has been used for harmonizing these properties. For instance, rubber blends of styrene-butadiene copolymer such as emulsion polymerized styrene-butadiene copolymer, solution polymerized styrene-butadiene copolymer or the like and polybutadiene such as high-cis polybutadiene, low-cis polybutadiene or the like have widely been used as a tire tread for passenger car. However, these rubber blends are not necessarily sufficient in the rolling resistance and wet skid resistance.

Therefore, it has been attempted to improve the rolling resistance, fracture properties and wear properties by introducing copolymer-metal bond into diolefin copolymer. In this connection, there are proposed conjugated diolefin copolymers having copolymer-metal (Sn, Si, Ge, Pb etc.) bond by using an organolithium initiator (Japanese Patent laid open No. 57-73,030, No. 58-122,939 and No. 58-122,947).

In the conjugated diolefin copolymers having copolymer-metal bond, however, there is yet room for improvement in the rolling resistance and processability as a rubber composition for tire.

SUMMARY OF THE INVENTION

It is an object of the invention to provide rubber compositions for use in tires which can solve the aforementioned drawbacks without damaging fracture properties and wear properties by using a given amount of a conjugated diolefin-vinyl-substituted aromatic hydrocarbon random copolymer which is obtained by using a particular initiator system and contains a particular amount of tin bonded to the copolymer by coupling with a halogenated tin compound.

According to the invention, there is the provision of a rubber composition for use in tires comprising at least 20% by weight of a conjugated diolefin-vinyl-substituted aromatic hydrocarbon random copolymer based on the total weight of the rubber content, said random copolymer being produced by copolymerizing in the presence of an organolithium polyfunctional initiator or in the presence of an organomonolithium initiator and a polyfunctional monomer and then subjecting to a coupling reaction with a compound inclusive of a halogenated tin compound, and satisfying the following requirements:

(i) a content of vinyl-substituted aromatic hydrocarbon is 3 to 60% by weight;

(ii) a content of tin bonded to the copolymer is not less than 400 ppm; and (iii) a Mooney viscosity ($ML_{1+4}^{100°\ C.}$) is 20 to 200.

DETAILED DESCRIPTION OF THE INVENTION

The conjugated diolefin-vinyl-substituted aromatic hydrocarbon random copolymer (hereinafter referred to as a conjugated diolefinic copolymer) used in the invention is produced by copolymerizing a conjugated diolefin and a vinyl-substituted aromatic hydrocarbon in the presence of a particular organolithium polymerization initiator, and has the content of vinyl-substituted aromatic hydrocarbon of 3-60% by weight, preferably 3-50% by weight.

When the content of vinyl-substituted aromatic hydrocarbon is less than 3% by weight, the fracture properties and processability are poor, while when it exceeds 60% by weight, the fracture properties and rolling resistance are poor.

As the conjugated diolefin, butadiene, isoprene and so on are preferably used.

As the vinyl-substituted aromatic hydrocarbon, styrene, α-methylstyrene, p-methylstyrene and the like are preferably used.

The conjugated diolefinic copolymer used in the invention is subjected to a coupling reaction with a compound inclusive of a halogenated tin compound, so that the content of tin bonded to the copolymer is not less than 400 ppm, preferably not less than 500 ppm. Moreover, the upper limit of the tin content is 10,000 ppm because it is difficult to produce the conjugated diolefinic copolymer having the tin content of more than 10,000 ppm in industry.

The content of tin bonded to the copolymer is measured as follows. That is, the resulting copolymer is again dissolved in toluene and poured into a large amount of methanol to remove the resulting precipitate of the unreacted tin compound from the copolymer. Thereafter, the amount of tin bonded to the copolymer is determined by atomic-absorption spectroscopy for the copolymer. When the tin content in the copolymer is less than 400 ppm, the rolling resistance becomes poor.

In the aforementioned Japanese Patent laid open specifications, it makes possible to put the tin content in the range defined in the invention, for example, by using the tin compound of more than the required amount to the organolithium initiator or by using a large amount of the organolithium initiator before the coupling with the tin compound, but the rolling resistance does not still get to the range aimed at the invention.

In U.S. Pat. No. 3,956,232, there is disclosed that the impact resilience is enhanced without raising the hardness by starting the copolymerization with the organolithium and then stopping it with a compound of $R_3SnX$ (wherein R is an alkyl group and X is a halogen atom). Although the tin content in the resulting copolymer is certainly within the range defined in the invention, the molecular weight distribution is not broad because of the use of the initiator system different from that of the invention. As a result, the processability and fracture properties are unsatisfactory.

On the other hand, when using the initiator system according to the invention the molecular weight distribution of the resulting conjugated diolefinic copolymer is broad and has $\overline{Mw}/\overline{Mn}$ (ratio of weight average molecular weight to number average molecular weight measured by GPC) of not less than 2. Further, the Mooney viscosity ($ML_{1+4}^{100°\ C.}$) of the conjugated diolefinic copolymer according to the invention is 20 to 200, preferably 30 to 150. When the Mooney viscosity is less than 20, the fracture properties and rolling resistance are poor, while when it exceeds 200, the processability is poor and also the industrial production is difficult.

The production of the conjugated diolefinic copolymer according to the invention will be described below. This copolymer is produced by copolymerization in the presence of organolithium polyfunctional initiator or in the presence of organomonolithium initiator and polyfunctional monomer and then coupling with a compound inclusive of a halogenated tin compound.

The copolymerization of conjugated diolefin and vinyl-substituted aromatic hydrocarbon is carried out in a solvent such as n-hexane, n-heptane, toluene, benzene, cyclohexane or the like in the presence of a particular organolithium initiator. As the organolithium initiator, use may be made of organolithium polyfunctional initiators such as tetramethylene-1,4-dilithium, hexamethylene-1,6-dilithium, 1,3-dilithiobenzene, 1,4-dilithiobenzene, octamethylene-1,8-dilithium, 1,4-dilithiocyclohexane and the like; and a combination of organolithium polyfunctional initiator with organomonolithium initiator. Further, the copolymerization can be carried out by adding a polyfunctional monomer such as divinyl benzene, diisopropenyl benzene or the like to the organomonolithium initiator such as n-butyllithium, sec-butyllithium or the like before or during the copolymerization.

In the copolymerization for the conjugated diolefinic copolymer, a polar compound such as a tertiary amine compound, an ether compound or the like is preferably used as a randomizing agent for the vinyl-substituted aromatic hydrocarbon. Moreover, the feeding of monomers may be carried out by divisional charge or continuous increment for the formation of random copolymer. After the completion of the copolymerization, a halogenated tin compound is added to the copolymerization system. As the halogenated tin compound, mention may be made of dimethyl dichlorotin, dibutyl dichlorotin, tin tetrachloride, tributyl chlorotin, butyl trichlorotin, methyl trichlorotin, tin dichloride and the like. Further, this halogenated tin compound may be used together with another coupling agent such as halogenated silicon compound, halogenated germanium compound, adipic acid diester or the like.

In view of the properties and industrial production, it is preferable that the copolymerization is carried out with organolithium initiator containing not less than 50 mol % of organodilithium compound and then the coupling is carried out with a coupling agent containing at least 50 mol % of $RR'SnX_2$ or $SnX_2$ (wherein each of R and R' is an alkyl group, a cycloalkyl group, and aralkyl group or an aryl group, and X is a halogen atom), whereby the conjugated diolefinic copolymer containing at least a given amount of tin bonded to the copolymer and having an improved processability can be obtained.

The rubber composition for use in tire according to the invention comprises not less then 20% by weight, preferably 30% by weight of the above conjugated diolefinic copolymer. As the other diolefine rubber to be blended with this copolymer, mention may be made of natural rubber, polyisoprene rubber, styrene-butadiene copolymer rubber, polybutadiene rubber, ethylene-propylene-diene terpolymer rubber, halogenated ethylene-propylene-diene terpolymer rubber and the like.

When the amount of the conjugated diolefinic copolymer according to the invention is less than 20% by weight, the balance between the wet skid resistance and the rolling resistance becomes unsatisfactory.

To the rubber composition according to the invention may be added additives and vulcanizing agent usually used in rubber industry. As the additive, there are carbon black, white carbon, calcium carbonate, extender oil such as aromatic oil, naphthene oil or paraffin oil, and so on.

The following examples are given in illustration of the invention and are not intended as limitations thereof.

EXAMPLES 1-6, COMPARATIVE EXAMPLES 1-7

Polymer-A

Into an autoclave of 5 l capacity purged with nitrogen gas were charged 2,000 g of cyclohexane, 100 g of styrene, 400 g of butadiene and °g of tetrahydrofuran as a polar compound, to which was added 6 millimol of tetramethylene-1,4-dilithium as a polymerization initiator. The resulting mixture was polymerized from 20° C. under adiabatic condition, and 4 millimol of dibutyl dichlorotin was added after the completion of polymerization. Then, the resulting product was added with 2.5 g of di-t-butyl cresol and subjected to solvent-removing and drying in the usual manner. As a result of analysis on the resulting polymer, the contents of vinyl bond and bound styrene (by infrared spectroscopy) were 58% and 20%, respectively, and $ML_{1+4}^{100°\ C.}$ was 70, and the content of tin in the polymer was 940 ppm, and $\overline{M}w/\overline{M}n$ was 2.7.

Polymer-B

The same procedure as in Polymer-A was repeated, except that styrene was not used. As a result of polymer analysis, the content of vinyl bond was 80%, $ML_{1+4}^{100°\ C.}$ was 65, and the tin content was 920 ppm.

Polymer-C

The same procedure as in Polymer-A was repeated, except that 50 g of styrene, 450 g of butadiene and 12 g of tetrahydrofuran were used. As a result of polymer analysis, the contents of vinyl bond and bound styrene were 50% and 10%, respectively, and $ML_{1+4}^{100°\ C.}$ was 52, and the tin content was 910 ppm.

Polymer-D

The polymerization was carried out by using 100 g of styrene, 400 g of butadiene, 0.1 g of divinylbenzene and 6 millimol of n-butyllithium as a polymerization initiator, to which was then added 3.8 millimol of dibutyl dichlorotin. After the addition of 2.5 g of di-t-butyl cresol, the resulting product was subjected to solvent-removing and drying in the usual manner. As a result of analysis on the resulting polymer, the contents of vinyl bond and bound styrene were 59% and 20%, respectively, and $ML_{1+4}^{100°\ C.}$ was 65, and the tin content was 900 ppm.

Polymer-E

The same procedure as in Polymer-A was repeated, except that 3.5 millimol of tetramethylene-1,4-dilithium and 2.5 millimol of n-butyllithium were used as an initiator and 3 millimol of dibutyl dichlorotin and 0.2 millimol of silicon tetrachloride were used as a coupling agent. As a result of polymer analysis, the contents of vinyl bond and bound styrene were 58% and 20%, respectively, and $ML_{1+4}^{100° C.}$ was 60, and the tin content was 708 ppm.

Polymer-F

The same procedure as in Polymer-A was repeated, except that 325 g of styrene and 175 g of butadiene were used. As a result of polymer analysis, the contents of vinyl bond and bound styrene were 44% and 65%, respectively, and $ML_{1+4}^{100° C.}$ was 58, and the tin content was 940 ppm.

Polymer-G

The same procedure as in Polymer-A was repeated, except that 1.2 millimol of dibutyl dichlorotin was added after the polymerization. As a result of polymer analysis, the contents of vinyl bond and bound styrene were 59% and 20%, respectively, and $ML_{1+4}^{100° C.}$ was 45, and the tin content was 283 ppm.

Polymer-H

The same procedure as in Polymer-A was repeated, except that 15 millimol of butane dilithium was used as an initiator. As a result of polymer analysis, the contents of vinyl bond and bound styrene were 58% and 20%, respectively, and $ML_{1+4}^{100° C.}$ was 15, and the tin content was 930 ppm.

Polymer-I

The same procedure as in Polymer-A was repeated, except that 6 millimol of n-butyllithium was used as an initiator. As a result of polymer analysis, the contents of vinyl bond and bound styrene were 57% and 20%, respectively, and $ML_{1+4}^{100° C.}$ was 38, and the tin content was 650 ppm.

A rubber composition was prepared by using each of Polymers A-I according to the compounding recipe shown in the following Table 1, kneaded in a plastomill of 250 cc, and vulcanized at 145° C. for 30 minutes. The properties of the vulcanizate were evaluated to obtain results as shown in the following Table 2.

TABLE 1

| Ingredient | part by weight |
|---|---|
| Polymer | 100 |
| Carbon black HAF | 50 |
| Aromatic oil | 10 |
| Stearic acid | 2 |
| Zinc white | 3 |
| Antioxidant 810NA*1 | 1 |
| Vulcanization accelerator CZ*2 | 0.6 |
| Vulcanization accelerator M*3 | 0.6 |
| Vulcanization accelerator D*4 | 0.4 |
| Sulfur | 1.5 |

*1N—phenyl-N—isopropyl-p-phenylenediamine
*2N—cyclohexyl-2-benzothiazolylsulfenamide
*3 2-mercaptobenzothiazole
*4 1,3-diphenylguanidine

TABLE 2

| | Polymer | | Other diolefin rubber (part) | | | $T_B$*3 | $E_B$*3 | Wet skid | Dunlop Rb | Process- | Wear |
|---|---|---|---|---|---|---|---|---|---|---|---|
| | kind | part | NR | E-SBR*1 | BR*2 | (kg+/cm²) | (%) | resistance*4 | at 70 (%) | ability*5 | resistance*6 |
| Example | | | | | | | | | | | |
| 1 | A | 60 | 40 | — | — | 262 | 510 | 120 | 73 | excellent | 104 |
| 2 | C | " | " | — | — | 256 | 500 | 108 | 74 | " | 100 |
| 3 | D | " | " | — | — | 260 | 495 | 118 | 73 | " | 103 |
| 4 | E | " | " | — | — | 263 | 500 | 117 | 73 | " | 102 |
| 5 | A | " | — | 20 | 20 | 252 | 510 | 122 | 73 | " | 100 |
| Comparative Example | | | | | | | | | | | |
| 1 | B | 60 | 40 | — | — | 240 | 490 | 115 | 74 | " | 102 |
| 2 | F | " | " | — | — | 235 | 480 | 130 | 65 | " | 96 |
| 3 | G | " | " | — | — | 252 | 475 | 118 | 68 | " | 101 |
| 4 | H | " | " | — | — | 230 | 490 | 123 | 66 | good | 91 |
| 5 | I | " | " | — | — | 250 | 495 | 120 | 69 | " | 99 |
| 6 | A | 10 | 90 | — | — | 275 | 510 | 100 | 72 | excellent | 103 |
| 7 | — | — | 50 | — | 50 | 250 | 505 | 100 | 72 | " | 100 |

*1 #1500 (trade name, styrene-butadiene copolymer rubber made by Japan Synthetic Rubber Co., Ltd.)
*2 BR01 (trade name, polybutadiene rubber made by Japan Synthetic Rubber Co., Ltd.)
*3 according to JIS K6301
*4 A skid tester made by Stanley Corp. was used at a measuring temperature of 250° C. The wet skid resistance is represented by and index on the basis that Comparative Example 7 is 100. The larger the index value, the better the property.
*5 The roll retention and extrusion processability of rubber blend after the kneading were evaluated at four steps of excellent, good, passable and bad.
*6 Pico wear, index on the basis that Comparative Example 7 is 100.

As seen from Table 2, the rubber compositions of Examples 1-5 are excellent in the properties and processability as compared with those of Comparative Examples 1-7.

Moreover, the rolling resistance was measured by means of a Dunlop flexometer. The larger the measured value, the lower the rolling resistance.

As mentioned above, according to the invention, the rolling resistance and the wet skid resistance are well balanced without damaging the fracture properties and wear properties, which makes possible to provide rubber compositions having excellent rolling resistance and processability.

What is claimed is:

1. A rubber composition for use in tires comprising at least 20% by weight of a conjugated diolefinvinyl-substituted aromatic hydrocarbon random copolymer based on the total weight of the rubber content, wherein said random copolymer is produced by:
(A) copolymerizing a conjugated diolefin and a vinyl-substituted aromatic hydrocarbon, in the presence of:
(i) an organolithium initiator containing not less than 50 mol % of an organodilithium compound, or
(ii) an admixture of an organomonolithium initiator and a polyfunctional monomer selected from the group consisting of divinylbenzene and diisopropenyl benzene and then, (B) subjecting the resulting copolymer to a coupling reaction with a halogenated tin compound in an amount of at least 0.5 equivalents of halogen in the halogenated tin compound per 1.0 equivalent of lithium, and wherein said random copolymer satisfies the following requirements:
(i) the content of vinyl-substituted aromatic hydrocarbon is 3 to 60% by weight;
(ii) the content of tin bonded to the copolymer is not less than 400 ppm; and
(iii) the Mooney viscosity ($ML_{1+4}^{100°\ C.}$) is 20 to 200.

2. The rubber composition according to claim 1, wherein said content of vinyl-substituted aromatic hydrocarbon is 3 to 50% by weight.

3. The rubber composition according to claim 1, wherein said content of tin bonded to the copolymer is 500 to 10,000 ppm.

4. The rubber composition according to claim 1, wherein said Mooney viscosity is 30 to 150.

5. The rubber composition according to claim 1, wherein said organodilithium compound is selected from tetramethylene-1,4-dilithium, hexamethylene-1,6-dilithium, 1,3-dilithiobenzene, 1,4-dilithiobenzene, octamethylene-1,8-dilithium and 1,4-dilithiocyclohexane.

6. The rubber composition according to claim 1, wherein said organomonolithium initiator is n-butyllithium or sec-butyllithium.

7. The rubber composition according to claim 1, wherein said halogenated tin compound is selected from dimethyl dichlorotin, dibutyl dichlorotin, tin tetrachloride, tributyl chlorotin, butyl trichlorotin, methyl trichlorotin and tin dichloride.

* * * * *